No. 611,157. Patented Sept. 20, 1898.
J. C. TRIANCE.
PASTE MOLD GLASS BLOWING MACHINE.
(Application filed Nov. 19, 1897.)
(No Model.) 3 Sheets—Sheet 2.

Witnesses:
Franck L. Durand
Jos. L. Coombs

Inventor:
John C. Triance,
Louis Bagger & Co.
Attorneys.

THE NORRIS PETERS CO., PHOTO-LITHO., WASHINGTON, D. C.

No. 611,157. Patented Sept. 20, 1898.
J. C. TRIANCE.
PASTE MOLD GLASS BLOWING MACHINE.
(Application filed Nov. 19, 1897.)

(No Model.) 3 Sheets—Sheet 3.

Witnesses:
Franck L. Ourand.
Jos. L. Coombs.

Inventor:
John C. Triance,
by Louis Bagger & Co.
Attorneys.

UNITED STATES PATENT OFFICE.

JOHN C. TRIANCE, OF ROCHESTER, PENNSYLVANIA.

PASTE-MOLD GLASS-BLOWING MACHINE.

SPECIFICATION forming part of Letters Patent No. 611,157, dated September 20, 1898.

Application filed November 19, 1897. Serial No. 659,209. (No model.)

*To all whom it may concern:*

Be it known that I, JOHN C. TRIANCE, a citizen of the United States, and a resident of Rochester, in the county of Beaver and State of Pennsylvania, have invented certain new and useful Improvements in Paste-Mold Glass-Blowing Machines; and I do hereby declare that the following is a full, clear, and exact description of the invention, which will enable others skilled in the art to which it appertains to make and use the same, reference being had to the accompanying drawings, which form a part of this specification.

My invention relates to paste-mold glass-blowing machines; and its object is to provide an improved construction of the same in which are employed two or more rotatable molds which are alternately elevated to receive the charge and lowered into water tanks or receptacles to cool and cleanse the same.

It is also an object to provide improved means for rotating and elevating and lowering the molds and also to improve the machine generally, whereby it will possess superior advantages with respect to efficiency in use.

The invention consists in the novel construction and combination of parts hereinafter fully described and claimed.

Figure 1:
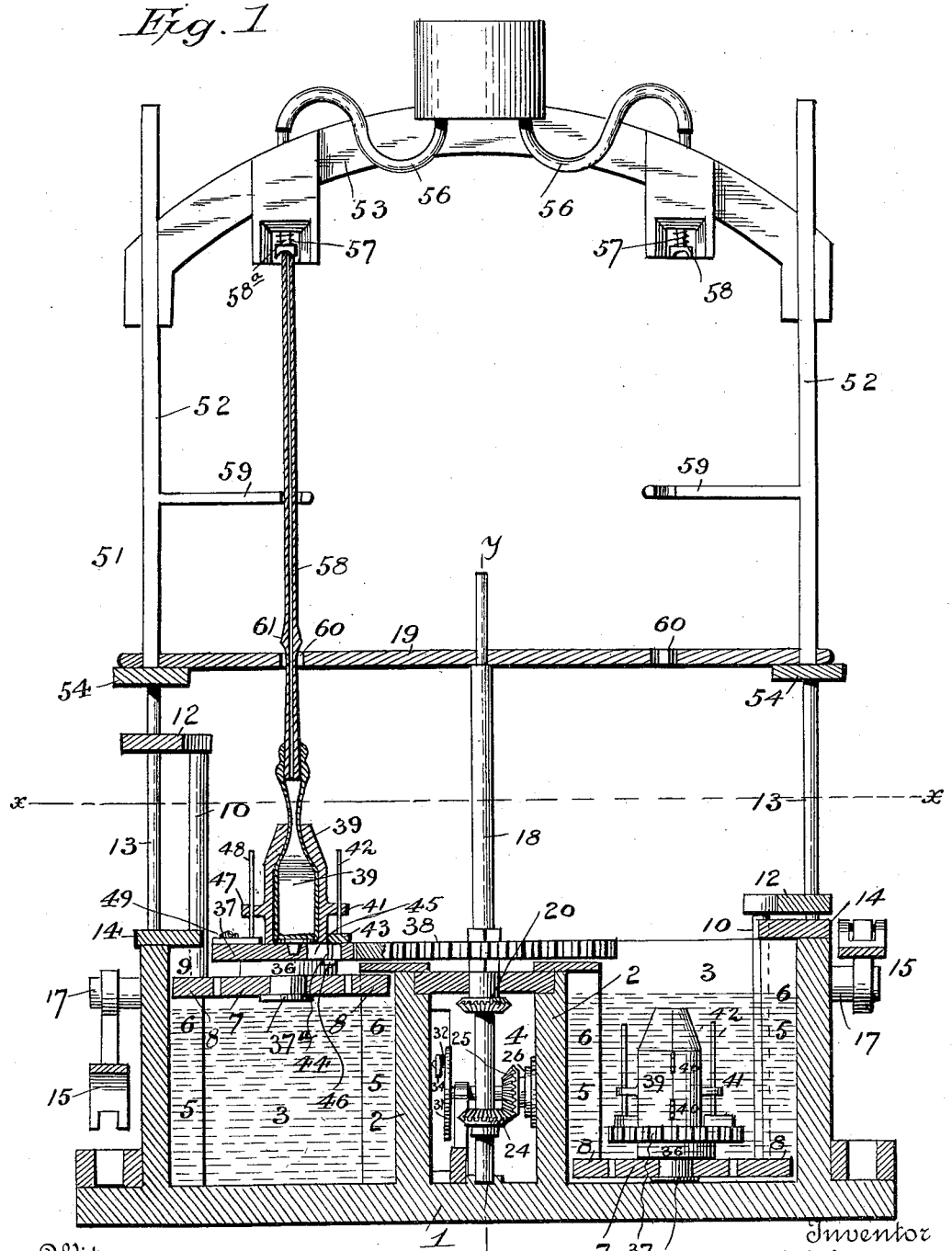
Figure 2:
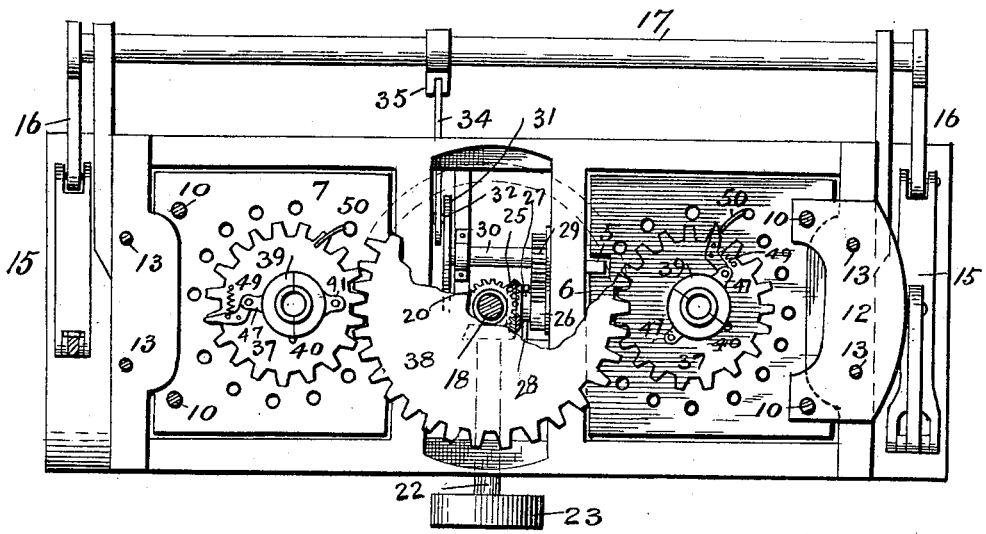
Figure 3:
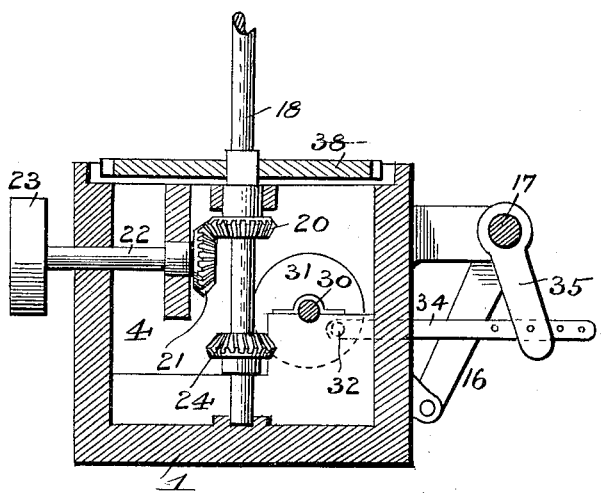
Figure 4:
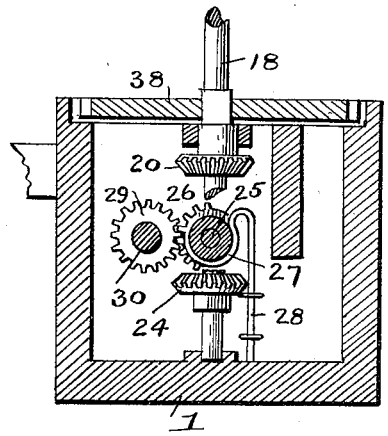
Figure 8:
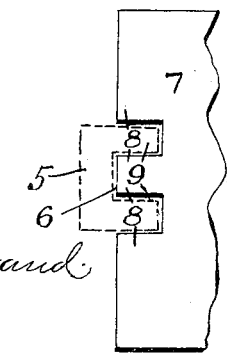
Figure 5:
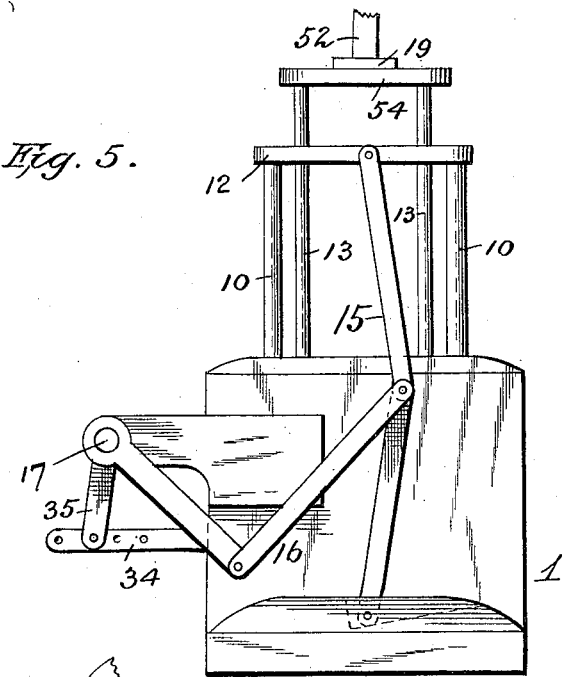
Figure 7:
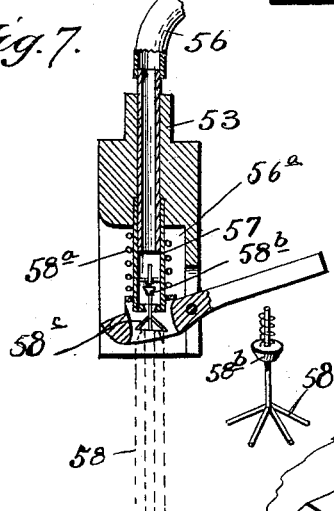
Figure 6:
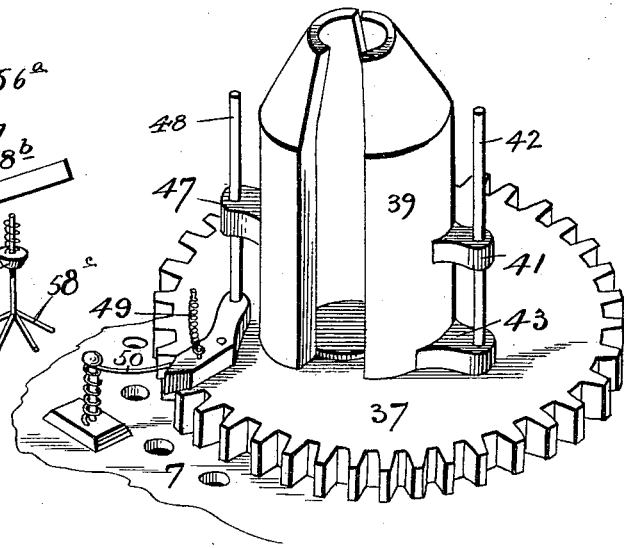

In the accompanying drawings, Figure 1 is a central longitudinal sectional view of a glass-blowing machine constructed in accordance with my invention. Fig. 2 is a horizontal section on the line $x\ x$, Fig. 1. Fig. 3 is a central cross-section of the lower part of the machine on the line $y\ y$, Fig. 1. Fig. 4 is a similar view looking in the opposite direction. Fig. 5 is an end view. Fig. 6 is a detail view of one of the molds. Fig. 7 is a detail sectional view of one of the air-valves. Fig. 8 is a detail view of one of the mold-carriers.

In the said drawings the reference-numeral 1 designates a rectangular box divided by transverse partitions 2 into three compartments 3 3 and 4. The end compartments 3 form water tanks or receptacles, while in the central compartment is located the gearing by which the machine is operated. Secured to the ends of said box and to the said partitions are vertical plates 5, formed with grooves 6, which serve as guides for the vertically-movable mold-carriers 7. These carriers consist of rectangular plates formed at each end with lugs 8 and recesses 9, which engage with the grooved guide-plates 5. At one end said carriers are provided with vertical rods 10, connected together at the upper ends by plates 12, through which loosely pass vertical rods 13, secured to the ends of the box 1. The rods 10 pass through plates 14, secured to the ends of the box, which plates serve to limit the upward movement of the carriers. Pivotally connected with plates 12 and with the bottom of the box on the outside thereof are toggle-levers 15, which are in turn connected by toggle-levers 16 with a longitudinal rock-shaft 17, by means of which the said plates and the carriers are vertically reciprocated. The said toggle-levers are so connected with the rock-shaft with respect to each other that while one carrier is elevated the other is lowered.

Located centrally in the compartment 4 is a vertical rotatable shaft 18, stepped in a bearing in the bottom of the box and the upper end passing through a marver-plate 19, hereinafter described. This shaft is provided with a bevel-gear 20, with which meshes a corresponding gear 21 on a transverse driving-shaft 22, passing through one of the sides of box 1 and provided with a pulley 23, which is driven by a belt. (Not shown.) Near the lower end said shaft is provided with a bevel-gear 24, which meshes with a corresponding bevel-gear 25, having formed therewith a mutilated gear 26. There is a peripheral groove 27 between said mutilated gear and the gear 25, with which engages a support 28. Said mutilated gear meshes with a pinion 29 on a shaft 30, provided at the opposite end with a wheel 31, having a wrist-pin 32. Pivotally connected with this wrist-pin is a pitman 34, which passes through the side of the box 1 and is pivoted to a crank 35, secured to the rock-shaft 17. By this construction when the shaft 18 is rotated the mutilated pinion through the connections is correspondingly rotated, which, meshing with pinion 29, will rotate the wheel 31 one-half of a revolution, causing the rock-shaft to be correspondingly rotated and one of the mold-carriers to be elevated and the other lowered through the medium of the toggle-levers. The mutilated gear will then travel out of engagement with the pinion 29, allowing the carriers to remain stationary for a short time to allow the molds to be charged and blown and the completed articles removed. Upon the mutilated gear again meshing with the pinion the wheel 31 will be again rotated, but the wrist-pin having traveled to a point diametrically opposite from where it first started the rock-shaft will be rotated in the opposite direction. By this means the carriers will be alternately elevated and lowered. Journaled in the said carriers are hubs 36 of cog-wheels 37, resting on said carriers. These hubs are provided with collars 37$^a$, which abut against the under sides of the carriers and serve to hold the hubs and cog-wheels in position. These cog-wheels are adapted to mesh with a large cog-wheel 38, fixed to the shaft 18, when they are elevated, whereby a rotatable movement is given to them.

The numeral 39 designates the molds made in two parts, hinged together by hinges 40. One of these parts is provided with a lug 41, through which passes a vertical rod 42, the lower end of which is secured to a fixed block 43, located in a slot 45 in the cog-wheels 37 and held in place by a screw-bolt 44 and a nut 46. By moving this block toward and away from the center of the cog-wheels molds of varying sizes may be employed. The other member of the mold is provided with an apertured lug 47, through which passes a vertical pin 48, the lower end of which is secured to a movable elbow-lever pivoted to the said cog-wheels 37 and provided with a coiled spring 49, the tension of which serves to close the mold. The free ends of these levers are adapted to engage with spring-rods 50, secured to the carriers, so that during the rotation of the molds at the proper moment the said levers will strike the rods and open the molds, and when they have passed said rods the tension of the springs will close the molds.

The numeral 51 designates a frame comprising the vertical bars 52, connected together at the upper ends by a curved cross-bar 53. The lower ends of bar 52 are connected together by plates 54, having holes therein with which engage the upper ends of the rods 13. The ends of plate 19 rest on these plates 54 and are slotted to engage with the bars 52. Secured to the curved bar 53 is a tank or reservoir for containing compressed air, with which are connected rubber hose 56, also connected with valve-boxes 56$^a$, provided with spring-actuated holders 57, adapted to receive the removable blowpipe 58. These holders consist of pivoted levers located in recesses in the lower part of the valve-boxes and are provided with coiled springs 58$^a$. Valves 58$^b$ are located in the valve-boxes and are connected with the said levers by rods 58$^c$, so that as said levers are elevated by the engagement of the blowpipes therewith the valves are opened. When the blowpipes are removed, the levers will be forced downward by the springs closing the valves and cutting off the air-supply. The numeral 59 designates slotted guide-arms for the blowpipes, which also pass through guide-slots 60 in the plate 19. The blowpipes intermediate the ends are formed with bulges 61, which will rest upon the guide-arms 19 when the molds are depressed, and thus be held in place.

The operation is as follows: In normal position one of the carriers is elevated and the other depressed, the molds being open. A workman will now take a charge of glass from the furnace on the end of the blowpipe and will blow into the latter to distend the same and will work it on the plate 19, so as to give it approximately the shape of the finished article. During this time the elevated mold is being rotated by means of the cog-wheel on the carrier, and just before the mold is closed by means of its lever and spring the bulb on the blowpipe is inserted in the mold and the upper end of the pipe inserted in the holder 57. The mold then closes, and the bulb therein is then forced to assume the contour or shape of the mold by the air-pressure from the air-tank. The mold will now continue to revolve, so that after it has made a complete revolution it will again open to allow the finished article to be removed, when it will be lowered into the water-receptacle and the other mold elevated to receive a charge.

By the above it will be seen that the molds are alternately elevated and opened to receive a charge and are then closed and rotated, so as to insure the proper shape being given to the article by the air-pressure, and the complete articles then removed and the molds lowered into the water-receptacles to cool and cleanse the same.

Of course the gears by which the machine is operated must be so proportioned and constructed that the different operations of elevating and lowering the molds and opening and closing the same shall all take place at the proper times.

It will also be noted that while the said molds are alternately movable up and down or vertically they are also intermittently movable—that is to say, that after they have been elevated instead of being immediately lowered they are held in such elevated position, so as to allow the charge to be inserted and the completed article to be removed, but are continuously rotated while in such position.

Having thus fully described my invention, what I claim is—

1. In a glass-blowing machine, the combination with the box provided with water-receptacles, of the alternately vertically reciprocating molds, rotatable upon their own vertical axes, substantially as described.

2. In a glass-blowing machine, the combination with the box provided with water-receptacles, of the alternately vertically reciprocating molds, rotatable upon their own vertical axes, and means substantially as described for automatically opening and closing the molds.

3. In a glass-blowing machine, the combination with the box provided with water-receptacles, of the alternately and intermittently vertically movable molds, rotatable upon their own vertical axes, substantially as described.

4. In a glass-blowing machine, the combination with the box provided with water-receptacles, of the molds and means for alternately and intermittently elevating and lowering the same, and means for continuously rotating said molds, when elevated, substantially as described.

5. In a glass-blowing machine, the combination with the box, the vertically and alternately movable carriers, the molds carried thereby, the vertical rods connected with said carriers, and the connecting-plates at the upper ends thereof, of the toggle-levers connected with said plates and with the bottom of the box, the toggle-levers connected therewith and the rock-shaft and means for oscillating the same, substantially as described.

6. In a glass-blowing machine, the combination with the box provided with a central compartment and end water-receptacles, of the vertically-movable carriers located in said water-receptacles, the cog-wheels journaled to said carriers and the molds secured to said cog-wheels, of the central rotatable shaft having a cog-wheel, which said cog-wheels are alternately adapted to engage, the bevel-gears for rotating said shaft, the bevel-gears on said shaft formed with a mutilated gear, the pinion meshing therewith, its shaft, the wheel secured thereto, the wrist-pin on said wheel, the pitman, the crank connected therewith, the rock-shaft to which said pitman is secured, and connections between said rock-shaft and carriers, for alternately reciprocating said carriers by the oscillation of the rock-shaft, substantially as described.

7. In a glass-blowing machine, the combination with the box provided with a central compartment and with end water-receptacles, the vertically-movable carriers located in said water-receptacles and the cog-wheels journaled to said carriers of the vertical rotatable shaft and the bevel-gears for operating the same, the bevel-gears on said shaft formed with a mutilated gear, the pinion engaging therewith, the wheel on the shaft of said pinion provided with a wrist-pin, the pitman connected therewith, the crank connected with said pitman, the rock-shaft to which said crank is secured, the toggle-levers connected with the ends of said rock-shaft and the toggle-levers connected therewith and pivotally connected with said carriers and the box, substantially as described.

8. In a glass-blowing machine of the character described, the combination with the box provided with water-compartments and the alternately and vertically movable mold-carriers, of the cog-wheels journaled in said carriers, the mold-sections connected therewith, the mold-sections hinged thereto, the lugs thereon, the vertical rods passing therethrough, the levers connected with said rods and pivoted to said cog-wheels, the coiled springs and the spring-arms connected with said carriers for tripping the levers and opening the molds, substantially as specified.

9. In a glass-blowing machine of the character specified, the combination with the alternately-reciprocating carriers, and the cog-wheels journaled thereto, having radial slots, of the adjustable blocks located in said slots, the pins or rods secured to said blocks, the mold-sections having a lug through which said rods pass, the section hinged thereto, and means for automatically opening and closing said mold-sections, substantially as described.

10. In a glass-blowing machine of the character described the combination with the box provided with water-receptacles, the alternately-reciprocating carriers, and the cog-wheels journaled thereto, of the two-part molds, one section of which is provided with a lug, the rod passing therethrough, and the adjustable block fitting in a slot in said cog-wheel, and the other section provided with a similar lug and rod, the lever secured to the lower end of this rod and pivoted to the cog-wheel, the coiled spring and the rod connected with said carrier for tripping the lever, substantially as described.

11. In a glass-blowing machine of the character described, the combination with the box and the alternately reciprocating and rotatable molds, of the frame, the air-reservoir, the hose, the valve-boxes and valves, and the spring-actuated lever, substantially as described.

12. In a glass-blowing machine of the character described, the combination with the box and the alternately reciprocating and rotatable molds, of the frame, the air-reservoir, the valve-boxes connected therewith, the valves, the pivoted levers, the coiled springs, the slotted guide-arms and the blowpipes formed with bulges intermediate the ends, substantially as described.

In testimony that I claim the foregoing as my own I have hereunto affixed my signature in presence of two witnesses.

JOHN C. TRIANCE.

Witnesses:
WILLIAM D. LOOS,
PANEY SAYERS.